United States Patent [19]

Rogers et al.

[11] Patent Number: 5,343,986
[45] Date of Patent: Sep. 6, 1994

[54] DISC BRAKE REPAIR MEANS AND METHOD

[75] Inventors: William C. Rogers, Dresher; William R. Lawson, Glenside, both of Pa.

[73] Assignee: R & B, Inc., Colmar, Pa.

[21] Appl. No.: 886,601

[22] Filed: May 20, 1992

[51] Int. Cl.$^5$ ............................................. F16D 65/14
[52] U.S. Cl. .............................. 188/73.45; 29/402.08
[58] Field of Search ............... 188/73.33, 73.34, 73.44, 188/73.45; 29/402.08; 411/386, 387, 418, 348, 320, 364, 515

[56] References Cited

U.S. PATENT DOCUMENTS

| | | | |
|---|---|---|---|
| 2,053,918 | 9/1936 | Peretzman | 411/386 X |
| 2,823,574 | 2/1958 | Rosan | 411/386 |
| 3,628,639 | 12/1971 | Daley, Jr. | 188/73.45 |
| 3,781,068 | 12/1973 | Brooks | 188/73.45 X |
| 4,376,332 | 3/1983 | Sandefur | 29/402.08 |
| 4,964,490 | 10/1990 | Watanabe | 411/320 X |
| 4,998,335 | 3/1991 | Esposito | 29/402.08 X |

FOREIGN PATENT DOCUMENTS

| | | | |
|---|---|---|---|
| 2,651,539 | 5/1977 | Fed. Rep. of Germany | 188/73.45 |
| 514655 | 11/1939 | United Kingdom | 411/515 |

OTHER PUBLICATIONS

Lee Domestic/Import Automotive Brake Hardware Catalog No. BH-3, Jun. 1988, Cover, pp. 7-19, 169-170.
Henningsen, Ron; GM Steering Knuckles Repairing Stripped Mounting Bolt Threads; *Undercar Digest;* Sep. 1991; pp. 26-28.

Primary Examiner—Mark T. Le
Assistant Examiner—Kevin D. Rutherford
Attorney, Agent, or Firm—Volpe and Koenig

[57] ABSTRACT

Typically, a disc brake the caliper assembly is mounted by a pair of specially configured mounting bolts to a cast-iron steering knuckle. In many models, the bolts are threadingly engaged with a steering knuckle or similar support structure in order to retain the bolts in place. To remove the caliper assembly, the two caliper mounting bolts are removed. However, in many instances, during servicing of the disc brakes, the threads within one of the apertures defined in the steering knuckle become stripped. A caliper mounting replacement bolt is provided having oversized self-tapping threads and an associated aperture for auxiliary retention. The inventive replacement bolt is used in place of the original caliper mounting bolt to enable reinstallation of the brake caliper assembly onto the steering knuckle in a quick and efficient manner. During the installation thereof, the inventive mounting bolt cuts a new thread into the steering knuckle aperture. In addition to the threading engagement with the steering knuckle, auxiliary bolt retention is provided, preferably, via use of a cotter pin.

3 Claims, 2 Drawing Sheets

DISC BRAKE REPAIR MEANS AND METHOD

This invention relates to disc brakes for automobiles or the like and, in particular, the invention relates to repairs for such disc brakes.

BACKGROUND OF THE INVENTION

Disc brakes for automobiles and other wheeled vehicles are well known in the art. A disc brake system generally comprises a rotor rigidly attached to the wheel and a caliper which is actuated to close upon the surface of the rotor to retard its rotational movement, thereby causing braking of the wheel. When the caliper is released, the brake rotor can spin freely permitting normal rotation of the wheel.

Brake pads attached to the caliper are designed to wear during braking and require periodic replacement. Replacement of the brake pads is effected by removing the caliper assembly from the disc brake.

Typically, the caliper assembly is mounted by a pair of specially configured mounting bolts to a cast-iron steering knuckle or other support structure. The bolts along with associated bolt sleeves serve as retaining pins for the caliper assembly. In its mounted position, the caliper assembly floats on the pin surfaces to accommodate normal wear of the brake pads. In many models, the bolts are threadingly engaged with a steering knuckle or similar support structure in order to retain the bolts in place.

To remove the caliper assembly, the two caliper mounting bolts are removed. However, in many instances, during servicing of the disc brakes, the threads within one of the apertures defined in the steering knuckle become stripped. One of the contributing factors to this problem is that the bolts are usually steel which is a harder substance than the steering knuckle which is usually cast-iron.

Prior to this invention, one of two solutions were generally used to remedy this thread stripping problem. The first solution was replacement of the entire steering knuckle. Such replacement is a very time consuming and expensive solution to the problem.

The second solution was to repair the threads using an insert to define a new thread within the cast-iron housing. Such method requires the enlargement of the stripped aperture within the housing and the installation of the threaded insert therein, the insert having a threaded aperture of the required size. This procedure is detailed in Undercar Digest, September, 1991, pp. 26–28, which article is incorporated by reference herein as if fully set forth.

While this latter solution is much less time consuming and much less expensive than replacing the entire steering knuckle, it is still a relatively time consuming operation.

It would be desirable to simplify the repair of this problem associated with servicing disc brakes.

SUMMARY AND OBJECTS OF THE INVENTION

A caliper mounting replacement bolt is provided having oversized self-tapping threads and an associated auxiliary retention means. When one of the threaded mounting apertures defined in a steering knuckle becomes stripped when servicing disc brakes, the inventive replacement bolt is used in place of the original caliper mounting bolt to enable reinstallation of the brake caliper assembly onto the steering knuckle in a quick and efficient manner.

Reinstallation of the brake caliper assembly onto the steering knuckle entails the alignment of the parts in a conventional manner in preparation for installation of the selectively configured mounting bolts. The replacement bolt is installed directly into a stripped steering knuckle brake aperture. During the installation thereof, the inventive mounting bolt cuts a new thread into the steering knuckle aperture.

In addition to the threading engagement with the steering knuckle, an auxiliary bolt retention means is provided. Preferably, the replacement bolt has a small aperture for receiving a cotter pin. After the replacement bolt is tightened, a cotter pin is installed through the aperture to serve as the auxiliary retention means for the replacement bolt.

For one relatively common type of disc brake used on General Motors vehicles, the replacement bolt is preferably slightly longer than the original caliper mounting bolt with the small aperture defined in the extended end of the replacement bolt. Where the configuration of the disc brake and/or disc brake mounting area does not permit the use of a longer replacement bolt, an alternative location for the cotter pin aperture or an alternate auxiliary type of auxiliary retaining means is employed.

It is an object of the invention to provide a quick, easy and inexpensive repair for a problem associated with the servicing of disc brakes.

Other objects and advantages of the invention will become apparent from the following description of a presently preferred embodiment of the invention.

DESCRIPTION OF THE PREFERRED EMBODIMENTS

Figure 1:
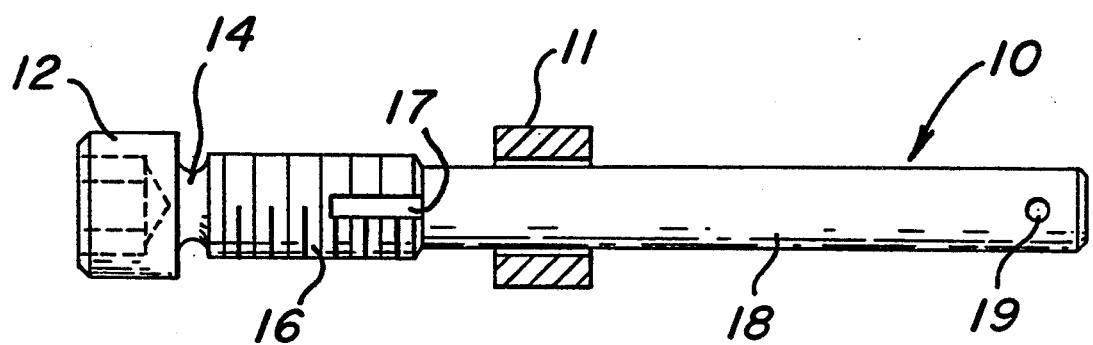
FIG. 1 is an elevated view of a caliper replacement bolt made in accordance with the teachings of the present invention.
Figure 3:
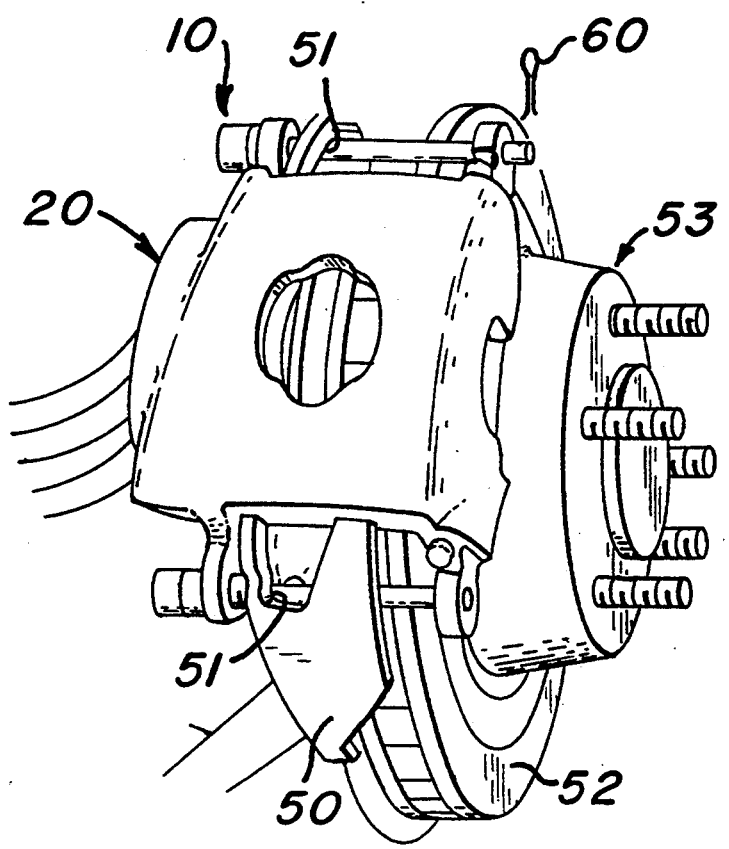
FIG. 3 is a perspective view of a reinstalled caliper assembly of the type depicted in FIG. 2 wherein a replacement mounting bolt of the type depicted in FIG. 1 has been employed to mount the caliper assembly onto a steering knuckle.

Referring to FIG. 1, there is disclosed a selectively configured replacement mounting bolt 10 and associated sleeve 11. The replacement bolt 10 and sleeve 11 are intended to replace original bolt 34 and sleeve 36 as discussed in more detail below.

The bolt 10 includes a head 12, a neck 14, a medial threaded portion 16 and an elongated pin end 18. The head 12 and neck 14 have substantially the same dimensions as an original caliper mounting bolt 34.

The threaded portion 16 of the bolt 10 has an axial position and length substantially equal to the axial position and length of the threaded portion of an original bolt 34. However, the threaded portion 16 has a larger thread diameter and a channel 17 defined therein to enable the threaded portion 16 to function as a tap to create new threads during installation of the replacement bolt.

Preferably, the entire bolt 10 is made of SAE 4137 alloy steel hardened to RC 34–38 such that the bolt has a tensile strength of at least 150,000 psi and the diameter of the threaded portion 16 is at least 0.008 inches greater than the diameter of the threaded portion of an original bolt 34. Accordingly, when the replacement bolt 10 is installed into a stripped aperture of a softer cast-iron steering knuckle, the threads 16 cut new threads into the cast-iron having a depth of at least 0.004 inches.

The preferred minimum thread enlargement is calculated by dividing the difference between the pitch diameter and major diameter of the original bolt 34 in half. In the disclosed embodiment, the bolt 34 has a pitch diameter of 0.402+0.002 inches and a major diameter of 0.432±0.004 inches which results in a calculated minimum enlargement of 0.015 inches. For this embodiment, the dimensions of the threaded portion 16 of the replacement bolt 10 have been selected to be 0.17 inches greater than original bolt 34 resulting in a major diameter of 0.449 ±0.004 inches and a pitch diameter of 0.419±0.002 inches for replacement bolt 10. Accordingly, when installed, the replacement bolt 10 cuts a new thread having a depth of about 0.008 inches. The thread dimensions of the replacement bolt 10 are selected to be close to the minimum, since too great of an enlargement of the threads will require an insertion force which may exceed the torsional limitations of the bolt.

The elongated end portion 18 of the bolt 10 has a diameter which is substantially the same as the diameter of the elongated end of an original bolt 34, but has a longer axial dimension that the original bolt. Defined within the extended axial end portion is an aperture 19. The aperture 19 is provided for a cotter pin which is used as an auxiliary retention means for replacement bolt 10.

The replacement sleeve 11 has an outside diameter and an axial length substantially equal to the outside diameter and axial length of an original bolt sleeve 36. However, the replacement sleeve 11 has an inside diameter approximately 0.008 inches greater then the bolt receiving aperture originally defined in the steering knuckle. The inside diameter of sleeve 11 is substantially greater than the inside diameter of an original bolt sleeve 36. In the preferred embodiment, the resultant wall thickness of the sleeve 11 is 0.085 inches, the sleeve 11 is made of sintered steel, the sleeve 11 is tested to withstand 22,500 lbs. of axial compressive force. The sleeve should be able to withstand at least 15,000 lbs. of axial compressive force.

Figure 2:
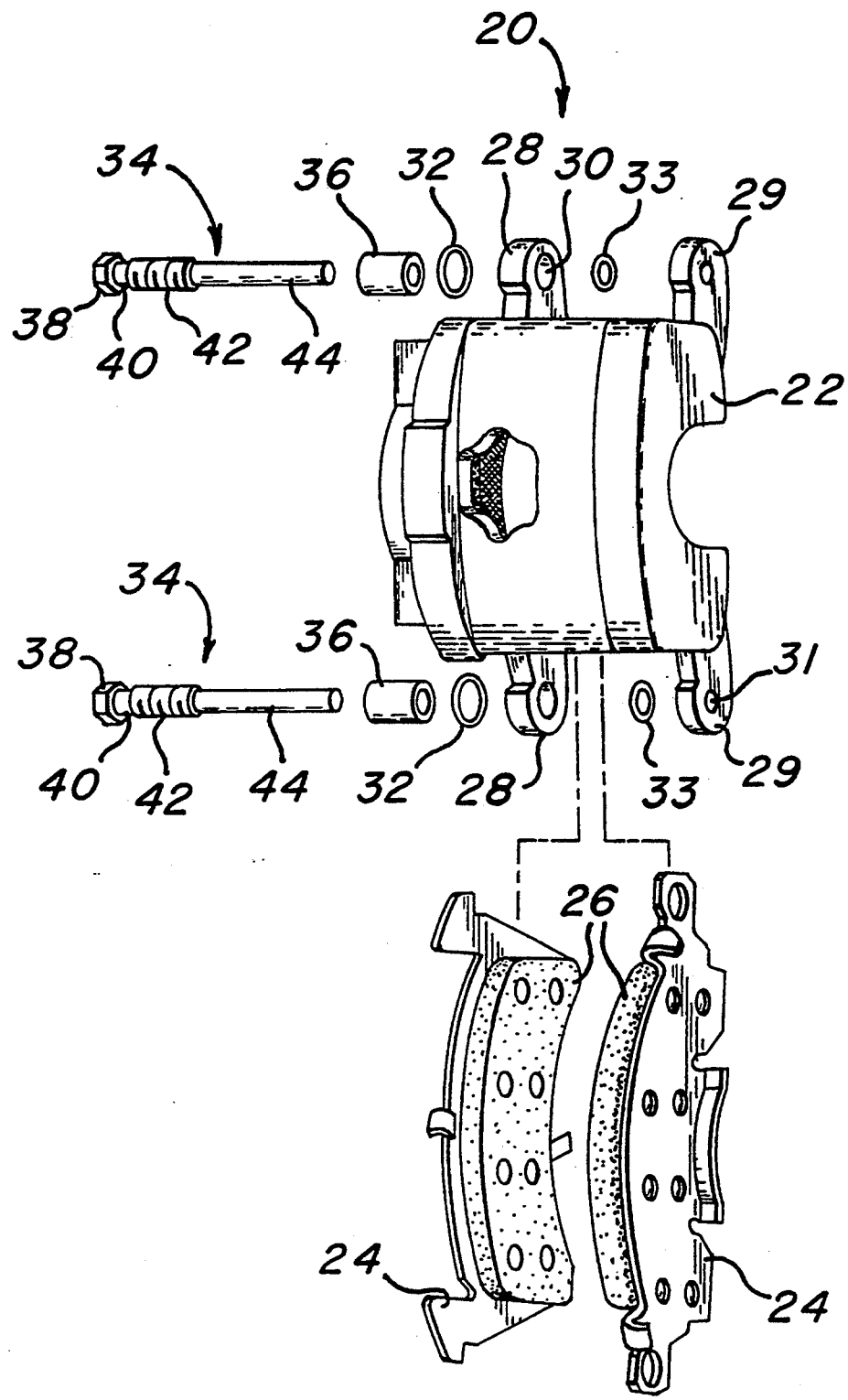
FIG. 2 is an exploded view of a conventional disc brake caliper assembly for which the replacement bolt shown in FIG. 1 is intended.

With reference to FIG. 2, there is shown a conventional disc brake caliper assembly 20. The particular model of caliper assembly depicted in FIG. 2 is a Delco-Moraine single piston floating caliper disc brake which is used in many General Motors cars.

The caliper assembly 20 includes a caliper housing 22 within which are disposed a pair of brake shoes 24, each having a brake pad 26 mounted thereon. The caliper assembly also includes a piston assembly (not shown) which actuates the brake shoes to close upon a rotor when the caliper assembly is installed.

The caliper housing 22 includes two pairs of mounting ears 28, 29 through which apertures 30, 31 are defined. O-rings 32, 33, respectively, are mounted within an interior groove (not shown) defined within the apertures 30, 31.

A pair of mounting bolts 34 and associated sleeves 36 are provided. Each mounting bolt 34, includes a head 38, a neck 40, a medial threaded portion 42, an elongated pin end 44.

When assembled, the sleeve 36 abuts the head 38 of the mounting bolt 34. The outside diameter of the sleeve 36 being substantially the same as the outside diameter of the head 38. The bolt head and sleeve define a pin support surface for the caliper housing ear 28; the elongated pin portion 44 of the bolt 34 defines a pin support surface for the caliper housing ear 29. When installed, the caliper assembly 20 "floats" via the O-rings 32, 33 on the supporting sleeve 36 and bolt 34 portions.

The caliper assembly 20 is mounted on a steering knuckle 50 having threaded mounting apertures 51 defined therein. The caliper assembly is positioned about a rotor 52 of a wheel assembly 53 such that the apertures 30, 31 of the two pairs of caliper ears 28, 29 are in line, respectively, with each of the two steering knuckle apertures 51. The mounting bolts 34, each having its associated sleeve 36 disposed thereon, are inserted through apertures 30 of the caliper housing ears 28, through the threaded steering knuckle apertures 51 and into the apertures 31 of caliper housing ears 29. The threads 42 of bolts 34 engage the threaded interior of the steering knuckle apertures 51 and the bolts are tightened thereby causing the respective sleeves 36 to be compressed between the heads 38 of the bolts 34 and the steering knuckle 50.

When the brakes are serviced, the bolts 34 are removed permitting removal of the caliper assembly 20 from the steering knuckle 50 and wheel assembly 53. During servicing, it is not uncommon for the threads in one of the steering knuckle apertures 51 to become stripped. This condition may not be readily apparent at the time of removal of the caliper assembly. However, when the caliper assembly is in the process of being reinstalled, the mechanic may discover that one of the mounting bolts 34 does not tighten against the steering knuckle.

At such time, in lieu of replacing the steering knuckle or repairing the aperture thread as discussed above, the original bolt 34 and sleeve 3 6, are removed, the stripped aperture 51 is cleaned, and the replacement bolt 10 and associated sleeve 11 are installed.

Preferably, the replacement bolt 10 is used only when one of the two steering knuckle apertures 51 become stripped. In such a case, the original bolt 34 and associated sleeve 36 is installed within the unstripped aperture 51 and thereafter the replacement bolt 10 and associated sleeve is installed within the stripped aperture 51. As the replacement bolt is installed, the replacement bolt self-tapping threads 16 cut new threads in aperture 51. As noted above, the new threads are preferably at least 0.008 inches in depth.

When the replacement bolt 10 is fully tightened, the elongated end 18 extends through aperture 31 of caliper housing ear 29 exposing cotter pin hole 19 of bolt 10. Thereafter, a cotter pin 60 is installed on the end of the bolt 10 through aperture 19 to define an auxiliary retention means for the replacement bolt 10. Accordingly, the cotter pin 60 retains the bolt in position in the event of the failure of the newly cut threads in the steering knuckle.

In the preferred embodiment, the elongated end portion 18 of the replacement bolt 10 is approximately 0.325 inches longer than the original bolt 34 in order to accommodate the auxiliary retention means. However, in some instances, there is insufficient clearance in the disc brake and wheel assembly to permit the use of a bolt which protrudes from the caliper assembly. In such cases, an alternate position for the installation of the cotter pin may be possible or a bolt head retaining clip may be fashioned to serve as the auxiliary bolt retention means.

Other variations and modifications to the invention in order to remedy the same type of problem in servicing different models of disc brakes having threadedly retained caliper mounting bolts will be recognized by those skilled in the art as within the scope of the present invention.

We claim:

1. A method for remounting a caliper assembly of a disk brake onto a supporting structure having a selectively sized threaded caliper bolt receiving aperture defined therein which has a stripped thread, the caliper assembly having mounting ears for floatable mounting on at least first and second axially aligned pin mounting surfaces having selected first and second diameters, respectively, the method comprising:

providing a replacement bolt having a selectively configured threaded portion which defines a primary retention means, said bolt threaded portion being made of a material which is harder than the portion of the supporting structure wherein said bolt receiving aperture is defined, said bolt threaded portion having a diameter of at least 0.008 inches greater than said bolt receiving aperture to enable said threaded portion to cut a new thread having a depth of at least 0.004 inches in said bolt receiving aperture, said bolt threaded portion having a selectively defined channel defined therein to facilitate the thread cutting action of said threaded portion in said bolt receiving aperture, said replacement bolt further including a pin portion having a diameter equal to said first selected diameter;

providing a bolt sleeve having an outside diameter equal to said second selected diameter, said sleeve having an inside diameter at least 0.008 inches greater than said bolt receiving aperture of the supporting structure;

aligning the mounting ears of the caliper assembly with said bolt receiving aperture defined in said supporting structure;

inserting said replacement bolt with said sleeve into the aligned ears and bolt receiving aperture such that said replacement bolt pin portion is positioned as said first pin mounting surface and said bolt sleeve is positioned as said second pin mounting surface of said caliper assembly and such that said bolt threaded portion is positioned for engaging said bolt receiving aperture of said support structure; and forcibly rotating said bolt to tappingly, threadingly engage said support structure such that said bolt threaded portion cuts a new thread in said bolt receiving aperture of at least 0.004 inches in depth thereby defining a primary bolt retention means.

2. The method of claim 1 further comprising installing auxiliary bolt retention means for maintaining the position of said replacement bolt in the event of failure of the threading engagement of said bolt with said support structure.

3. The method of claim 2 wherein said replacement bolt is made of SAE 4137 alloy steel and is provided with a cotter pin receiving aperture, said sleeve is made of a material such that said sleeve can withstand an axial compressive force of 22,500 pounds, and a cotter pin is provided as said auxiliary bolt retention means and is installed in said aperture of said replacement bolt.

* * * * *